United States Patent [19]

Wallace et al.

[11] Patent Number: 4,635,731

[45] Date of Patent: Jan. 13, 1987

[54] IMPULSE TOOL

[75] Inventors: William K. Wallace, Barneveld; Kenneth A. McHenry, Clinton, both of N.Y.

[73] Assignee: Chicago Pneumatic Tool Company, New York, N.Y.

[21] Appl. No.: 680,998

[22] Filed: Dec. 13, 1984

[51] Int. Cl.⁴ .................... B23Q 5/00

[52] U.S. Cl. .................... 173/12; 192/56 F

[58] Field of Search .................... 173/93, 93.5, 93.6, 173/12; 464/25, 37, 38; 192/56 F, 56 R, 150; 403/351

[56] References Cited

U.S. PATENT DOCUMENTS

| | | | |
|---|---|---|---|
| 2,268,412 | 12/1941 | McCombs | 173/93.6 |
| 2,293,786 | 8/1942 | Worden | 64/29 |
| 2,293,787 | 8/1942 | Worden | 64/29 |
| 2,398,392 | 4/1946 | Page | 81/52.3 |
| 2,565,579 | 8/1951 | Thorner | 64/28 |
| 2,575,475 | 11/1951 | Stutzke | 64/28 |
| 2,586,314 | 2/1952 | Emery | 192/30.5 |
| 2,632,485 | 3/1953 | Peck | 144/32 |
| 2,684,738 | 7/1954 | Kaplan | 192/30.5 |
| 2,720,956 | 10/1955 | Coombes | 192/30.5 |
| 2,768,546 | 10/1956 | Amtsberg | 81/52.3 |
| 2,809,734 | 10/1957 | Graybill | 192/30.5 |
| 2,834,442 | 5/1958 | Sturrock | 192/0.096 |
| 3,116,617 | 1/1964 | Skoog | 64/26 |
| 3,174,606 | 3/1965 | Hornschuch et al. | 192/150 |
| 3,199,314 | 8/1965 | Schrader | 64/26 |
| 3,210,959 | 10/1965 | Brown | 64/26 |
| 3,210,960 | 10/1965 | Vaughn | 64/26 |
| 3,212,295 | 12/1965 | Vaughn | 64/26 |
| 3,214,940 | 11/1965 | Kramer | 64/26 |
| 3,214,941 | 11/1965 | Shulters | 64/26 |
| 3,220,526 | 11/1965 | Gattiker, Jr. | 192/150 |
| 3,252,303 | 5/1966 | Weasler et al. | 64/29 |
| 3,253,662 | 5/1966 | Sacchini | 173/12 |
| 3,263,449 | 8/1966 | Kramer | 64/26 |
| 3,289,407 | 12/1966 | Brown | 60/54.5 |
| 3,319,723 | 5/1967 | Kramer | 173/93.6 |
| 3,368,631 | 2/1968 | MacNaughton | 173/12 |
| 3,380,264 | 4/1968 | Moore | 64/28 |
| 3,428,137 | 2/1969 | Schaedler et al. | 173/93.6 |
| 3,441,115 | 4/1969 | Gunther | 192/56 |
| 3,487,901 | 1/1970 | Kulman | 192/56 |
| 3,511,349 | 5/1970 | Herscovici | 192/56 |
| 3,608,334 | 9/1971 | Zinner | 64/29 |
| 3,672,185 | 6/1972 | Schoeps | 173/93 |
| 3,717,011 | 2/1973 | Vana | 64/26 |
| 3,799,307 | 3/1974 | Tate | 192/56 |
| 3,908,766 | 9/1975 | Hess | 173/12 |
| 4,006,608 | 2/1977 | Vuceta | 64/29 |
| 4,113,080 | 9/1978 | Thackston et al. | 192/150 |

*Primary Examiner*—Donald R. Schran
*Assistant Examiner*—James L. Wolfe
*Attorney, Agent, or Firm*—Donald E. Degling

[57] ABSTRACT

A rotary impulse device for an air motor or electric motor drive designed to produce an adjustable output torque is provided. The driven output shaft or impulse member has a cam surface driven by a driver which is axially or radially movable in a driving cage mechanism whereby the torque developed by the impulse device cyclically varies between zero and a predetermined adjustable maximum quantity. Due to the cyclical variation in the torque developed there is no impact component of the torque delivered and therefore the tightening torque will not increase as the number of torque cycles increases.

16 Claims, 12 Drawing Figures

IMPULSE TOOL

BACKGROUND OF THE INVENTION

1. Field of the Invention

This invention relates generally to a portable power tool of the impulse type and more particularly to an impulse device designed to deliver a controllable torque to a threaded fastener.

2. Description of the Prior Art

In many industrial applications it is desirable to tighten threaded fasteners to a predetermined torque automatically and rapidly. Such applications include internal combustion engine head bolts and connecting rod bearings and wheel nuts or studs. Many applications also exist, particularly in the maintenance area, where it is necessary to loosen threaded fasteners in order to disassemble a machine. While it is desirable that the tool develop a predetermined torque, it is also important to be able to adJust the predetermined torque and to use the same tool for tighlening and loosening threaded fasteners.

A number of devices have been developed utilizing either an electric motor or an air motor as the powering mechanism. Generally, an hydraulic or mechanical mechanism is attached to the output shaft of the air or electric motor which is adapted to convert the rotary motion into torque impacts. The production of torque impacts within the torque conversion mechanism often leads to high impact stresses and consequent wear of the working parts of the mechanism. Where a series of impacts or hammer blows is entailed, the predetermined torque may be exceeded. It is an object of the present invention to develop a controllable predetermined torque through cyclical impulses which do not constitute a series of impacts. It is also an object of the invention to reduce the noise associated with the prior art torque devices of the impact type.

SUMMARY OF THE INVENTION

In accordance with the present invention, the kinetic energy of the air or electric motor is delivered to a rotatable cage containing an axially offset longitudinal chamber or a radial chamber within which a ball or a piston may be moved so as to develop a pressure proportional to its longitudinal position. A driver of ball or piston shape is adapted to contact a cam surface on an impuse member. Deveopment of a torque on the rotating impulse member causes the driver to ride up the cam surface. At the predetermined torque level the driver stops and thereafter rides over the cam thereby permitting the air or electrical motor to turn while the impulse member is at rest.

As the device produces no torque until the driver has begun to ride up the cam surface, the developed torque is delivered smoothly and without any impact component. Repeated cyclical applications of the torque will produce a tightening torque equal to the predetermined torque selected by the operator. The delivered torque is a function of the pressure deveoped by the axial movement of the piston and the shape of the cam on the impulse member. It is adjusted by controlling the maximum pressure that can be developed or the portion of the cam slope the driver contacts when the maximum pressure occurs.

In one form of the invention, the maximum pressure is controlled by varying the piston compression stroke, while in a second form of the invention, an adjustable pressure relief valve performs this function directly. A third form of the invention utilizes the stroke adjustment to change the position of driver contact on the impulse cam when the maximum pressure occurs to vary the torque.

The cam shape machined on the impulse member has three different zones. The cam slope is increasing in the first zone, constant in the second zone, and decreasing in the third zone. The two forms of the invention that utilize pressure as a control, operate with the driver contact in the second zone or constant slope portion of the cam. The third version utilizes the constant slope zone for maximum torque, but lets the driver contact point move out into the decreasing slope zone of the cam for the lower torque values.

Furher objects and advantages of the present invention will become apparent to those skilled in the art from the following detailed description and the accompanying drawings in which.

DETAILED DESCRIPTION OF THE INVENTION

Figure 1:
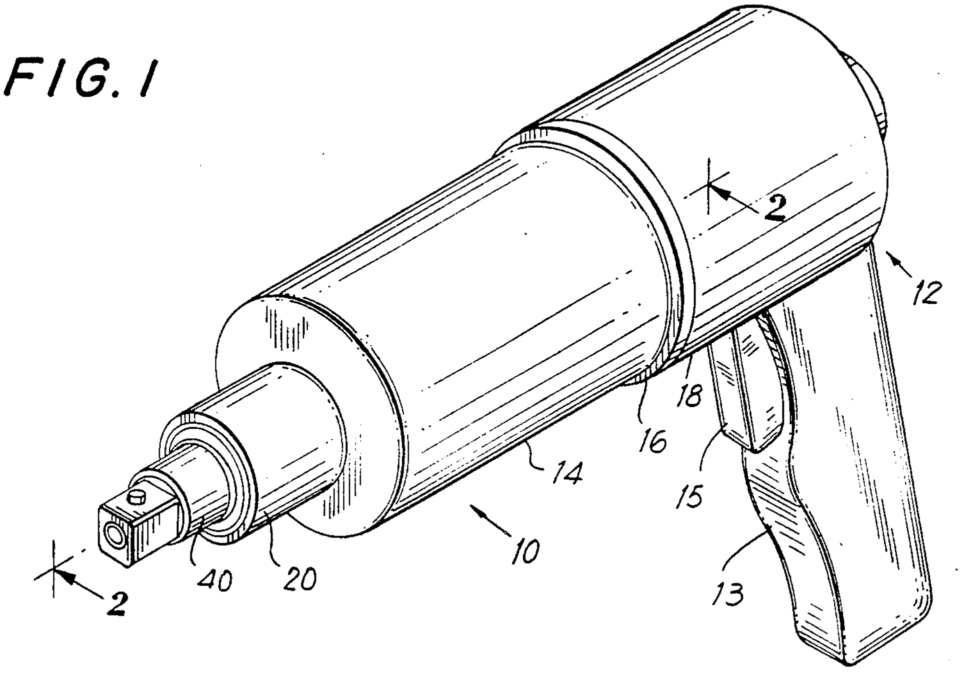
FIG. 1 is a perspective view of an impulse device in accordance with the present invention connected to a conventional air motor driving unit.

Referring to the drawings, FIG. 1 shows a perspective view of the impulse device 10 in accordance with the present invention which is affixed to an air motor driving unit 12 of well-known construction or to an equivalent electric motor drive.

Figure 2:
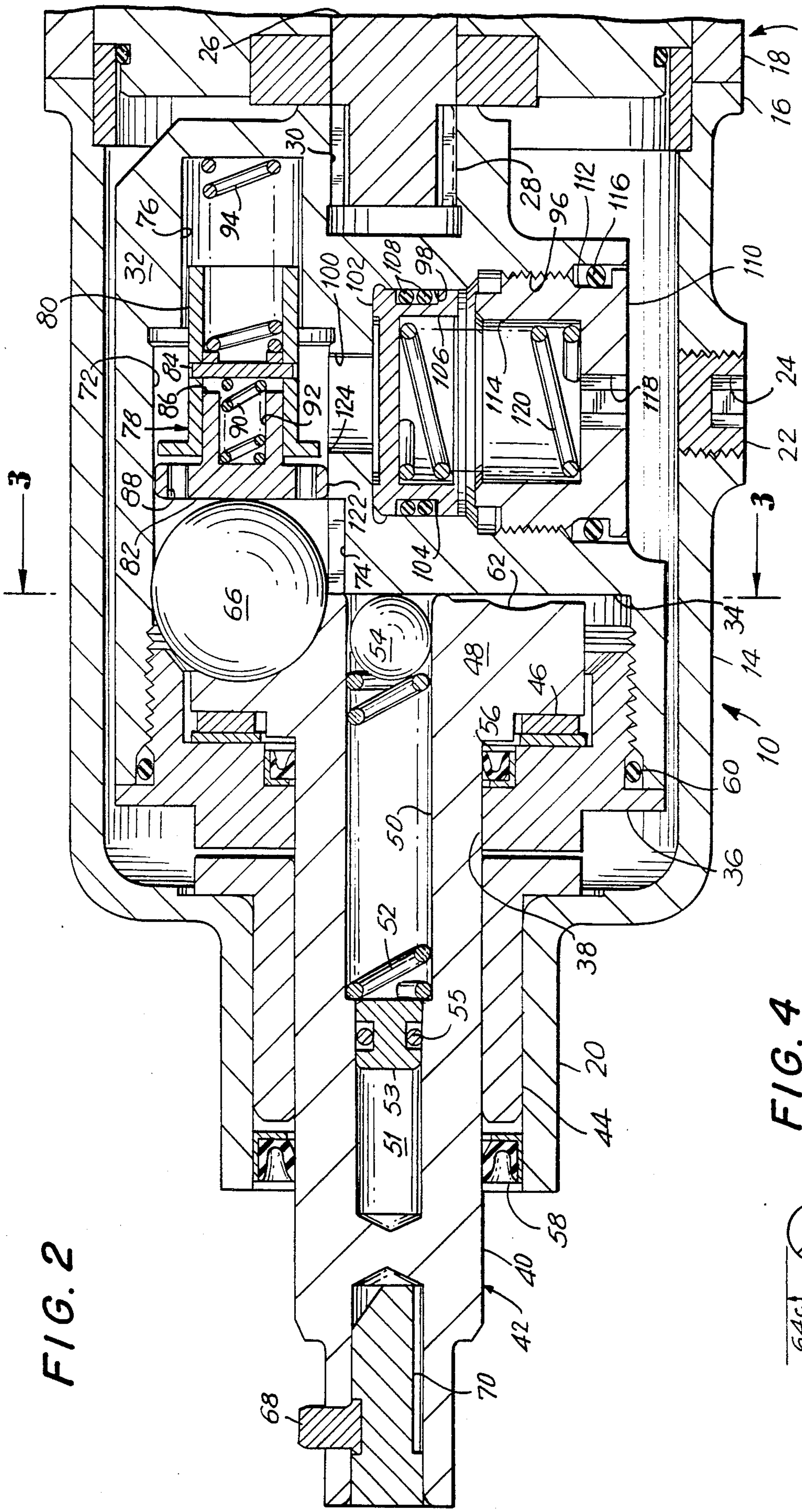
FIG. 2 is an enlarged longitudinal cross sectional view of one form of the present invention taken along line 2—2 of FIG. 1.

As shown in FIG. 1, the driving unit 12 may be fitted with a pistol grip 13 and trigger 15. Referring now to FIG. 2, the impulse device 10 is provided with a generally cylindrical outer casing 14 having a flange 16 at one end adapted to mate with the outer casing 18 of the air motor driving unit 12. The casing 14 has a reduced portion 20 at the end opposite the flange 16. A plug 22 having a wrench socket 24 is threaded into a sidewall of the outer casing 14 to provide access to the adjustable mechanism contained within the casing 14.

The air motor drive shaft 26 is provided with a polygonal or splined end portion 28 which mates with a polygonal or splined cavity 30 formed in one end of the generally cylindrical cage member 32 rotatably mounted within the outer casing 14. A threaded recess 34 is formed in the opposite end of the cylindrical cage 32 and adapted to receive a threaded cap 36.

The threaded cap 36 has a central orifice 38 through which the shaft 40 of an impulse member 42 passes. The impulse member 42 is journalled in bushing 44 which is seated in the reduced portion 20 of the outer casing 14. A thrust bearing 46 is positioned between the inner end of the threaded cap 36 and the forward end of the head 48 of the impulse member 42. Preferably, the thrust bearing 46 is an anti-friction bearing such as a needle bearing. An axial bore 50 is formed in the impulse member 42 to carry a compression spring 52 and a thrust member 54. The thrust member 54 is preferably a ball as shown in FIG. 2 but could also be generally cylindrical in shape with a rounded end to contact the cage member 32. The bias of the spring 52 urges the thrust member 54 against an inner surface of the cylindrical cage 32 and simultaneously urges the head 48 of the impulse member 42 against the thrust bearing 46. As will be described in more detail below, maintaining the impulse member 42 in contact with the thrust bearing 46 and threaded cap 36 prevents the development and transmission of impact loads within and through the impulse device 10. Grease seal 56 may be located between the shaft 40 of the impulse member 42 and the threaded cap 36 to prevent leakage of oil from the cylindrical cage 32. Seal 58 prevents dirt from entering the bushing 44. An O-ring 60 may be placed between the threaded cap 36 and the cylindrical cage 32 to seal the cylindrical cage member.

Bore 50 may be extended to form a chamber 51 of smaller diameter than the bore 50 within which chamber a piston 53, sealed by an O-ring 55, may reciprocate. Chamber 51, which contains no hydraulic fluid or oil, serves as an expansion chamber to prevent any excessive build-up of pressure within the cage member 32 as a result, for example, of a temperature rise of the hydraulic fluid surrounding the impulse member 42 within the cage member 32.

Figure 3:
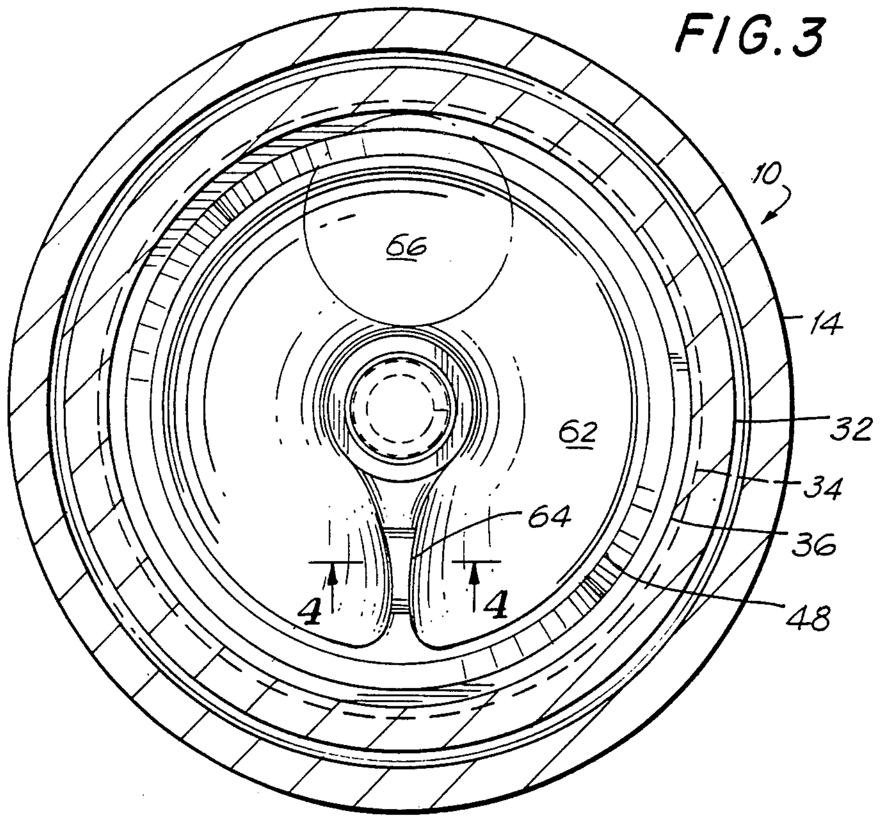
FIG. 3 is a transverse cross sectional view of the present invention taken along line 3—3 of FIG. 2.
Figure 4:
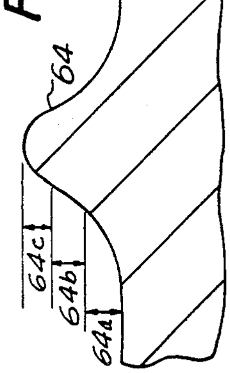
FIG. 4 is a fragmentary cross section of the cam surface ofthe impulse member taken along line 4—4 of FIG. 3.

A cam surface 62 is formed on the inboard end of the head 48 of the impulse member 42. As best shown in FIGS. 3 and 4 the cam surface 62 is trough shaped to accommodate a driver 66, which may be in the form of a ball, and includes a single rise 64 which is symmetrica about its apex. The total rise 64 is contained within about one quadrant of the head 48 of the impulse member 42. Referring particularly to FIG. 4, it will be noted that the cam rise 64 comprises three zones. In zone 64*a* the slope of the cam surface increases from zero to maximum while in zone 64*b* the slope is constant and equal to the maximum slope in zone 64*a*. In zone 64*c* the slope decreases from the maximum value to zero at the apex of the cam rise 64.

The outboard end of the impulse member 42 may be polygonal in shape and adapted to mate with an appropriate tool, such as wrench socket (not shown), which may be locked to the impulse shaft 40 by a retainer pin 68 secured by rubber plug 70.

The driver 66 is carried in a bore 72 formed parallel to the axis of the cylindrical cage 32. A relief groove 74 is machined partway down a sidewall of the bore 72. A second bore 76 coaxial with bore 72, but of smaller diameter, extends from the blind end of bore 72. A piston valve means 78 operates within the bores 72 and 76 and is driven by the driver 66. The piston valve means 78 comprises a valve seat piston 80 having a cylindrical body portion sized to reciprocate in the bore 76 and a flange portion of a diameter intermediate the diameter of the bores 72 and 76. Valve piston 82 is provided with a cylindrical body portion, adapted to reciprocate to a limited extent, or to telescope, within a bore formed in the valve seat piston 80, and a flange portion which seals against the inner surface of the bore 72. The telescoping action of the valve piston 82 with respect to the valve seat piston 80 is controlled by a pin 84 affixed to the cylindrical body of the valve seat piston 80 but moveable within longitudinal slots 86 formed in the body of the valve piston 82. A series of orifices 88 are formed through the flange portion of the valve piston 82. A compression spring 90 is located within a blind bore 92 formed in the valve piston 82. One end of the spring 90 is seated at the end of the blind bore 92 while the other end of the spring engages the pin 84 so as to bias the flange portion of the valve piston 82 away from the flange portion of the valve seat piston 80. A second compression spring 94 is positioned within the blind bore 76 and in engagement with the end of the valve piston 82 so as to bias the piston valve means 78 toward the driver 66.

A second series of coaxial bores is formed in the cylindrical cage 32 normal to the bores 72 and 76. This second series of bores comprises a threaded bore 96, a smaller cylinder bore 98 and a still smaller connecting bore 100 which intersects the bore 72. A piston 102 mounted for reciprocation in the cylinder bore 98 is provided with a circumferential groove 104 and an internal blind bore 106. One or more O-rings 108 are carried by the circumferential groove 104 to seal the piston 102 with respect to the cylinder bore 98. A threaded adjusting collar 110 having a circumferential groove 112, and an internal bore 114 is threaded into the threaded bore 96 and sealed by O-ring 116 located in the groove 112. A polygonal passageway 118 adapted to be engaged by an appropriate wrench (not shown) is formed through the end of the threaded adjusting collar 110. One end of a low-force compression spring 120 is seated in the bore 114 of the threaded adjusting collar 110 while the other end of the spring is seated in the blind bore 106 of the piston 102 so as to bias the piston 102 toward the connecting bore 100. As shown in FIG. 2, the polygonal passageway 118 can be aligned with the plug 22 in the outer casing 14. It will be appreciated that rotation of the adjusting collar 110 will vary the stroke of the piston 102 which is movable between the end of the bore 98 and the end of the adjusting collar 110 against the bias of the spring 120.

The cylindrical cage 32 and the outer casing 14 are filled with hydraulic fluid or oil.

The operation of the impulse device 10 is as follows: The air motor drive shaft 26 is mechanically connected to the cylindrical cage 32 so as to rotate the cage whenever the air motor 12 is operated. The cage 32 carries the driver 66 which also rides on the cam surface 62 of the impulse member 42. As the driver 66 contacts the rise 64 of the cam surface, forces are developed between the driver 66 and the impulse member 42 on the one hand and the cage 32 and piston valve means 78 on the other hand. These forces may be resolved into a pair of equal and opposite axial forces exerted respectively on the thrust bearing 46 and the valve piston 82 and a torque which is applied through the cage 32 and driver 66 to the impulse member 42. The magnitude of the torque component varies with the position of the driver 66 on the cam rise 64 and is affected both by the pressure developed behind the driver 66 and the slope of the cam rise 64. When the driver 66 operates within the zone 64b on the cam rise 64 where the slope is constant, the torque output will vary directly with the pressure developed behind the driver 66 and thus the hydraulic pressure may be used as a control. It will be appreciated that the cage member 32 may be driven either in a clockwise or counterclockwise direction so as to deliver torque impulses in either direction. The axial force on the valve piston 82 causes the valve piston 82 to move against the bias of spring 90 until the flange portion of the valve piston 82 seats against the flange portion of the valve seat piston 80 thereby sealing the orifices 88.

As soon as the orifices 88 are sealed, further motion of valve piston 82 will begin to increase the hydraulic pressure behind the piston valve means 78 in the bores 72, 76 and 100 to a level which will then move the piston 102 against the bias of the low-force spring 120 until the piston 102 seats against the inner end of the adjusting collar 110. Thereafter, continued travel of the valve piston 82 will cause the pressure behind the piston valve means 78 to increase to a higher level. Such pressure increase will be reflected as an increased torque delivered to the impulse member 42.

It will be noted in FIG. 2 that the circumferential edge of the flange portion of the valve piston 82 is curved so that essentially line contact is made with the bore at the point indicated by 122. When this point on the flange reaches the edge of the connecting bore 100 (indicated at 124) the pressure developed behind the piston valve means 78 will be released, thereby permitting the driver 66 to be driven further into the bore 72 a distance sufficient to clear the cam rise 64.

As the driver 66 rides down the cam rise 64, the cylindrical cage 32 and its components accelerate and the springs 90 and 94 drive the valve piston 82 back towards the impulse member 42. At the same time, the spring 120 returns the piston 102 to its original position. When the rotating cage 32 and driver 66 again engage the cam rise 64, the driver will be driven into the bore 72 and another torque impulse will be delivered to the impulse member 42. It will be appreciated that the developed torque on the impulse member 42 will be proportional to the stroke of the valve piston 82 but will also be affected by the shape of the cam rise 64 and the leakage of hydraulic fluid past the valve piston 82 which leakage is, in turn, affected by the rotational speed of the cage 32. While the total axial motion of the valve piston 82 remains constant, the portion of the stroke during which pressure can be built up so as to develop a torque on the impulse member 42 depends upon the stroke of the piston 102, which is controlled by setting of the adjusting collar 110 and the length of the relief groove 74. It can be seen that as the stroke of the piston 102 is reduced, the delivered torque will be increased.

It will be understood that when the impulse device of the present invention is operated, for example, to tighten a nut, the cage 32 and impulse member 42 will rotate as a unit until the fastened members absorb the kinetic energy of the rotating parts or the preset tightening torque has been applied. If the fastened members absorb the kinetic energy without obtaining the preset torque, the impulse member 42 will remain at rest and the piston valve means 78 will open thereby releasing the pressure behind the driver 66. This action permits the cage 32 to drive the driver 66 over the cam rise 64. The motor will then accelerate the cage 32 and the parts connected thereto, delivering another value or quantum of kinetic energy to the fastened parts when the driver 66 again comes into contact with the cam rise 64 on the impulse member 42. This action is repeated until the preset tightening torque has been applied to the fastener. Thereafter, the cage will continue to rotate as the driver 66 rides over the cam rise 64, developing the predetermined torque during each cycle. Because of the shape of the cam rise 64 on the impulse member 42, the direction of the force on the driver is gradually changed so that the dirver is brought into contact with the cage wall and piston before a high value of load is applied. This avoids an impact phenomenon which would tend to increase the effective torque as a function of the number of cycles of torque application. Thus, in accordance with the present invention, the same tightening torque will be appied even though the tool is allowed to cycle repeatedly, once the preset torque has been obtained. As a concomitant to the absence of impact, the noise produced by the impulse mechanism of the present invention will be minimized.

It will also be noted that the valve piston 82 is isolated from the cam surface 62 of the impulse member 42 and is affected only by a pure axial force delivered by the driver 66. This construction reduces the effects of asymmetrical loading which tend to increase the wear on the piston valve means 78 and bore 72 of the assembly. Although it is advantageous, for the reasons stated, to utilize a driver 66 which is separate from the piston valve means 78, it will be understood that the piston 82 and the driver 66 may be combined into an integral unit comprising a piston having a hemispherical shape on one end.

Axial impacts on the impulse member 42 are also inhibited by the spring 52 and the thrust member 54 which provide a bias on the impulse member 42 so as to maintain it in contact with the thrust bearing 46 and the threaded cap 36 attached to the cylindrical cage 32. As noted above, torsional impact is avoided by the shape of the cam rise 64.

As shown in FIG. 2, the piston valve means 78 comprises valve seat piston 80 and valve piston 82, the flange of valve piston 82 contacting the bore 72 and containing orifices 88. It will be appreciated that the piston valve means 78 would function in the same manner if the orifices 88 were located in the flange of valve seat piston 80; that flange contacted the bore 72; and the flange of valve piston 82 cleared the bore 72.

Figure 5:
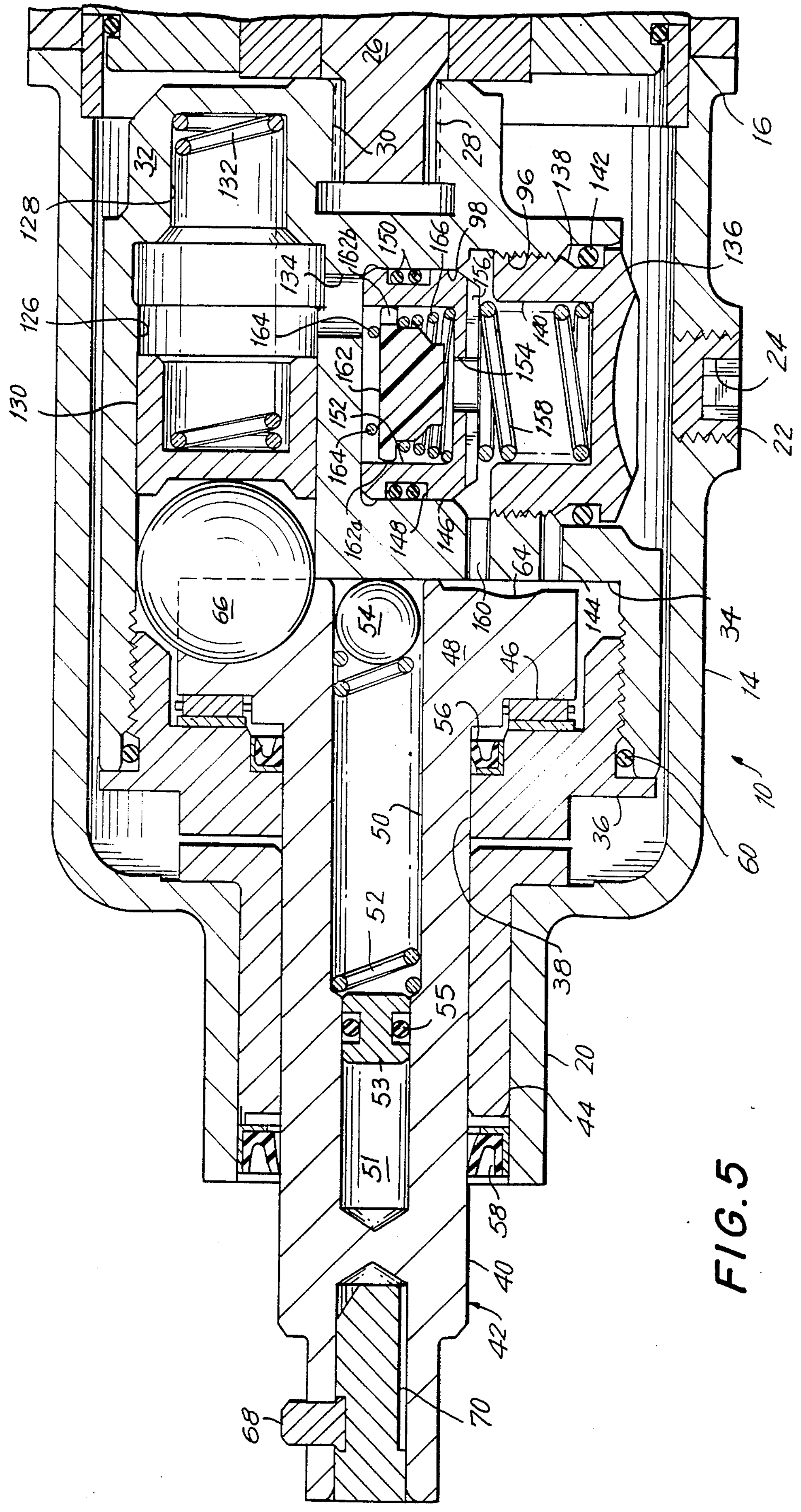
FIG. 5 is a longitudinal cross sectional view similar to FIG. 2 but showing a variation in the check valve mechanism.

An alternative design for an impulse device in accordance with the present invention is shown in FIG. 5. This alternative design employs a different check valve means. In the design of FIG. 5, parts which are identical to those shown in FIG. 2 are identified by the same designators and the description of them will not be repeated.

Referring now to FIG. 5, the driver 66 is movable within a bore 126 formed in the cage 32 parallel to the axis of the cage 32. A smaller bore 128 may extend deeper into the cage 32. A piston 130 is mounted for reciprocating motion within the bore 126 and is biased toward the driver 66 by a compression spring 132 one end of which is seated against the underside of the head of the piston 130 and the other end of which is seated in the bore 128.

Instead of the concentric bore 100 shown in FIG. 2, an eccentric bore 134 communicates between bore 98 and the piston bore 126. An adjustable collar 136 having a circumferential groove 138 and an inner bore 140 is threaded into the threaded bore 96. An O-ring 142 may be located in the circumferential groove 138 to seal the adjustable collar 136 and the bore 96. If desired, a drain passageway 144 may be provided to communicate between the groove 138 and the recess 34 in the cage 32.

A piston 146 having a circumferential groove 148 is mounted for reciprocating motion in bore 98. One or more O-rings 150 may be employed to seal the piston 148 against the bore 98. The piston 146 is provided with an internal bore 152 and an orifice 154. A transverse groove 156 communicating with the orifice 154 is formed on the end of the piston 146 which is adjacent to the adjustable collar 136. The piston 146 is biased away from the adjustable collar 136 by a compression spring 158, one end of which is seated in the bore 140 of the adjustable colar 136 while the other end contacts an end of piston 146. A drain passage 160 communicates between the juncture of bores 96 and 98 on the one hand and the recess 34 on the other hand.

A check valve 162 is located within the bore 152 of piston 146. Check valve 162 is biased toward an open position, where its upper end abuts against pins 164 secured in the bore 152 of piston 146, by a compression spring 166, one end of which is seated in the bore 152 of piston 146 while the other end bears against a flange 162(*a*) formed on the upper side of the check valve 162. The flange 162(*a*) has formed therein a plurality of notches 162(*b*) so that hydraulic fluid may pass the check valve 162. The cross sectional area of the notches 162(*b*) together with the area of the clearance space between the check valve 162 and the bore 152 is designed to be less than the area of the orifice 154 so that when hydraulic fluid flows past the check valve 162 and through the orifice 154 there will be a pressure drop across the check valve 162. It will be appreciated that any such pressure drop will tend to move the check valve toward a sealing position over the orifice 154 against the bias of spring 166. Preferably, the spring is chosen to have a rate sufficient to hold the check valve 162 open until the pressure behind the piston 130 is about 200 psi.

Operation of the device shown in FIG. 5 is as follows: Rotation of the air motor drive shaft 26 rotates the cage 32 and the driver 66. When the driver 66 contacts the cam rise 64 it will tend to ride up the cam rise and drive the piston 130 further into the bore 126 against the bias of spring 132. Such motion of the piston 130 causes hydraulic fluid contained in the bores 126 and 128 to be pumped through the orifice 154 and through the drain passageway 160 back to the low pressure zone surrounding the impulse member 42. Due to the pressure drop across the check valve 162, the check valve will close and further motion of the piston 130 will drive the piston 146 downwardly until it contacts the adjustable collar 136. Once piston 146 has seated against the adjustable collar 136, further motion of the piston 130 results in a rapid buildup of pressure behind the piston 130 which pressure is reflected as an axial force on the impulse member 42 and a torque tending to rotate the impulse member.

If the kinetic energy of the rotating parts is sufficient to tighten the fastener to the pre-set torque, the driver 66 will be forced over the cam rise 64 on the impulse member 42. Repeated cycles of impulses will not produce any increased tightening torque. If the kinetic energy of the rotating parts is insufficient to produce the desired pre-set torque, the rotating parts, including the cage 32 and the impulse member 42 will stop and the cage 32 will move so that the driver tends to ride down the cam rise 64. This motion, together with leakage past the piston 130 causes the pressure behind piston 130 to drop. When that pressure reaches a pre-determined level, e.g., 200 psi, the check valve 162 opens, thus functioning as a pressure relief valve. Once the check valve opens, the driver 66 will ride over the cam rise and spring 132 will drive the piston 130 and the driver 66 outwardly so as to refill the mechanism with hydraulic fluid. At the same time, the air motor drive mechanism will accelerate the rotating parts to commence another cycle of operation. Each cycle of operation will increase the torque delivered to the work until the preset torque is attained.

Figure 6:
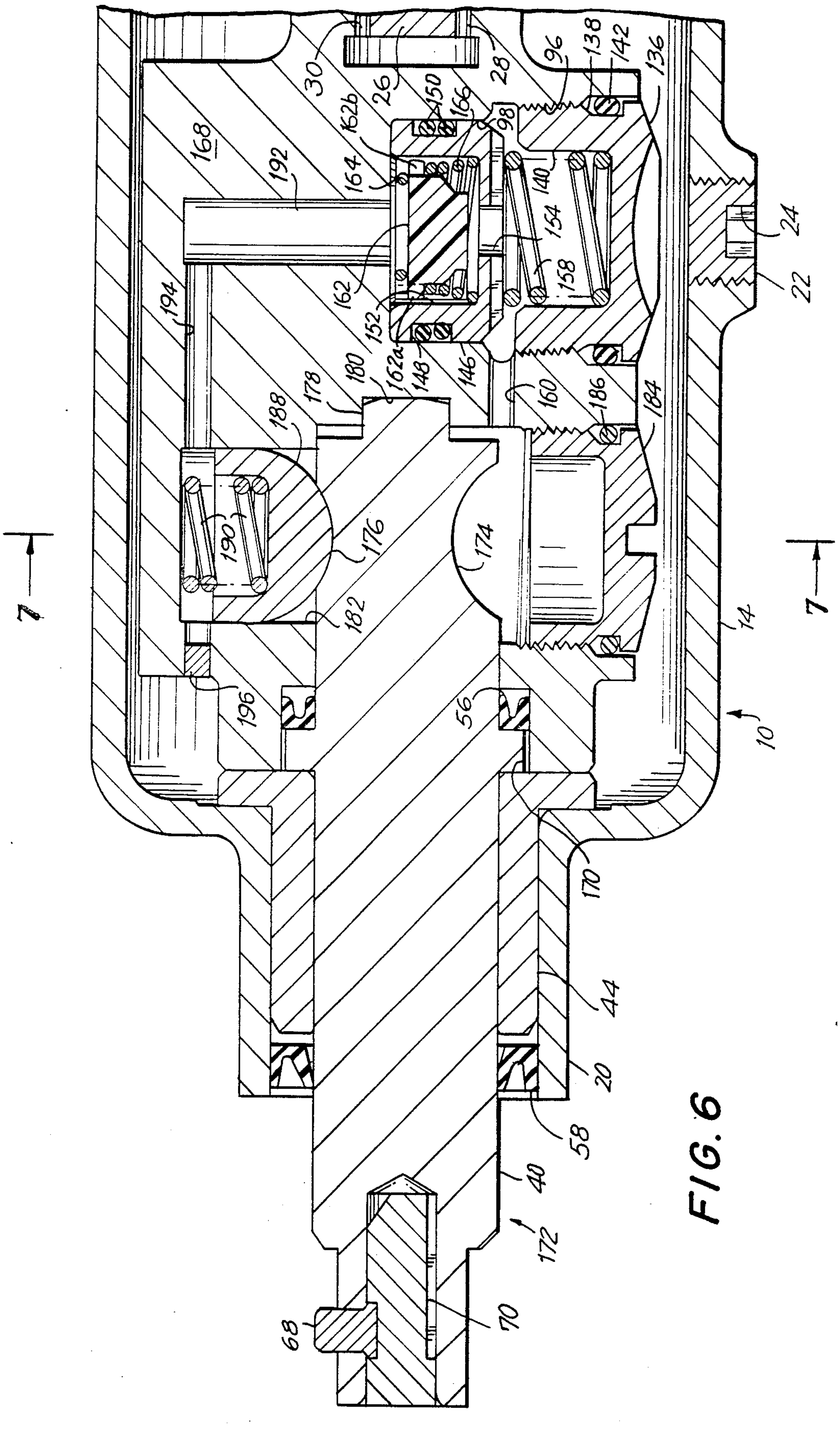
FIG. 6 is a longitudinal cross sectional view similar to FIG. 2 but showing another form of the present invention wherein the driver moves in a radial instead of a longitudinal direction.

Referring now to FIG. 6, another form of the present invention is shown wherein the driver moves in a radial rather than a axial direction, thereby substantially eliminating the axial thrust. Parts which are common to the device as shown in FIG. 5 are given the same designators and their description wil not be repeated here.

Figure 7:
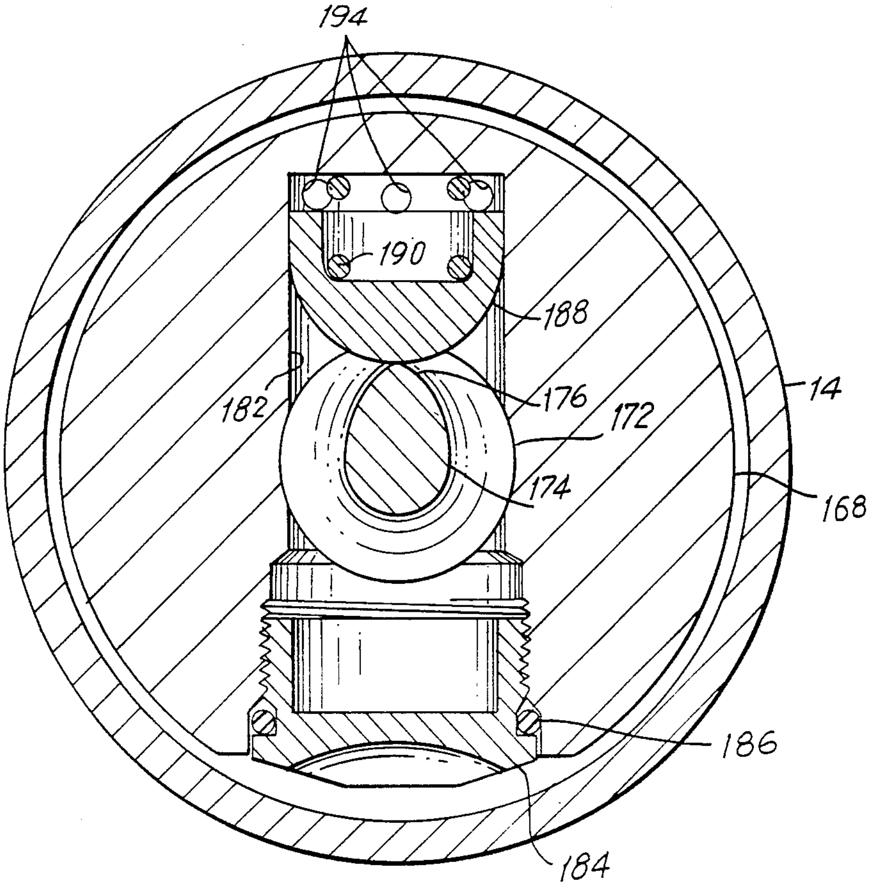
FIG. 7 is a transverse cross sectional view taken along line 7—7 of FIG. 6.

As shown in FIGS. 6 and 7, the rotatable cage member 168 is provided at one end with a splined cavity 30 to receive the drive shaft 26 of the air motor and is provided with an aperture 170 at the other end which is rotatably connected to the shaft 40 of impulse member 172. The impulse member 172 carries, near its inner end, a circumferential cam surface 174 having a single cam rise 176. The shape of the cam rise 176 is similar to that of the cam rise 64 shown in FIG. 4. A stub shaft 178 may be formed on the inner end of the impulse member 172 to mate with a bore 180 formed in the rotatable cage 168.

A diametral blind bore 182, threaded at its open end, is formed in the rotatable cage in alignment with the cam surface 174. A plug 184 carrying an O-ring 186 seals the open end of the diametral blind bore 182. A driver 188 is mounted for reciprocating movement within the bore 182 and biased toward the cam surface 174 by a compression spring 190.

Bore 98 containing piston 146 and check valve 162 communicates with the portion of the bore 182 behind driver 188 through diametral bore 192 and one or more axial bores 194 formed in the cylindrical cage member 168. The open end of axial bore 194 is sealed by the plug 196.

The mechanism shown in FIGS. 6 and 7 operates in the same way as the mechanism of FIG. 5 with the exception that the action of the driver 188 on the cam rise 176 produces a transverse instead of axial load and therefore no thrust bearing is required.

Another alternative design for an impulse device in accordance with the present invention is illustrated in FIGS. 8-12. In this alternative design the predetermined torque is established by a direct control of the pressure developed by the stroke of the driver rather than indirectly by varying the effective length of the stroke of the driver.

Figure 8:
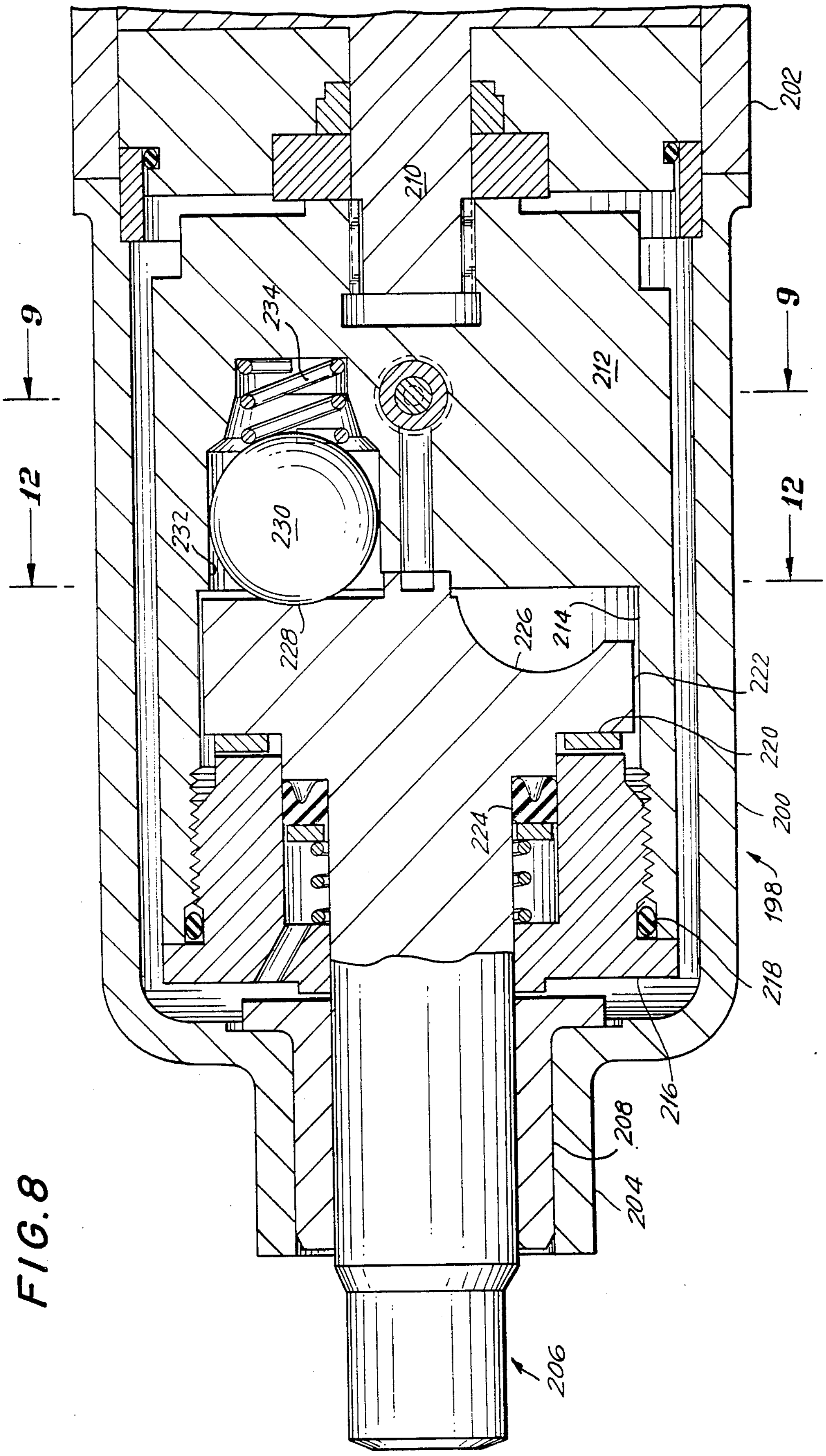
FIG. 8 is a longitudinal cross sectional view similar to FIG. 2 but showing still another form of the present invention.

FIG. 8 shows a longitudinal cross section of an impulse device of the alternative design in accordance with the present invention. The impulse device 198 is generally cylindrical in form and comprises an outer casing 200 affixed to an air or electric motor 202. The outer casing 200 has a reduced portion 204 opposite the air or electric motor 202 from which the impulse member 206 extends. The impulse member 206 is carried by a bushing 208 fixed to the reduced portion 204 of the outer casing 200. Appropriate means are provided on the end of the impulse member 206 to carry any desired tool, e.g., a socket wrench (not shown).

The air motor drive shaft 210 drivingly engages a rotatable cage 212 which is generally cylindrical in shape and is provided with a threaded cylindrical bore 214 on the end opposite from that which engages the air motor drive shaft 210. A threaded cap 216 mates with the threaded bore 214 of the rotatable cage 212 and may be sealed by O-ring 218. The threaded cap 216 supports a thrust bearing 220 against which the head portion 222 of the impulse member 206 bears. A spring loaded grease seal 224 may be positioned between the impulse member 206 and the threaded cap 216 to prevent leakage of high pressure hydraulic fluid past the thrust bearing 220.

Figure 12:
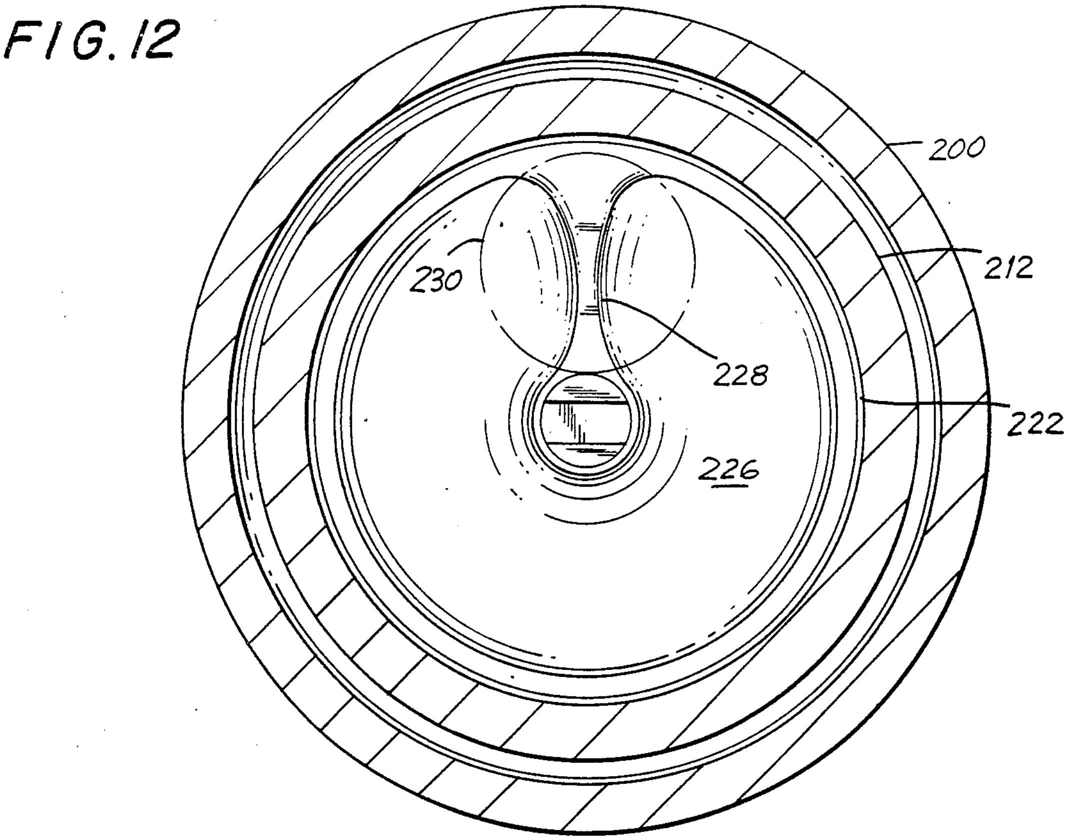
FIG. 12 is a transverse cross sectional view taken along line 12—12 of FIG. 8.

As best shown in FIGS. 8 and 12, a cam surface 226 formed on one end of the impulse member 206 has a single cam rise 228 symmetrical about its apex and contained within about one quadrant of the head 222 of the impulse member 206. The cam rise 228 comprises three zones like zones 64*a, b* and *c* (See FIG. 4) described above with respect to the embodiment shown in FIG. 2. A driver 230 carried by a bore 232 formed in the rotatable cage member 212 rides on the cam surface 226. The driver 230 is biased toward the impulse member 206 by a compression spring 234. The diameter of the driver 230 and the bore 232 are substantially equal so that as the driver 230 is driven into the bore 232 by the cam rise 228, hydraulic fluid contained in the bore 232 (and connecting passageways, as described below) will be pressurized.

Figure 9:
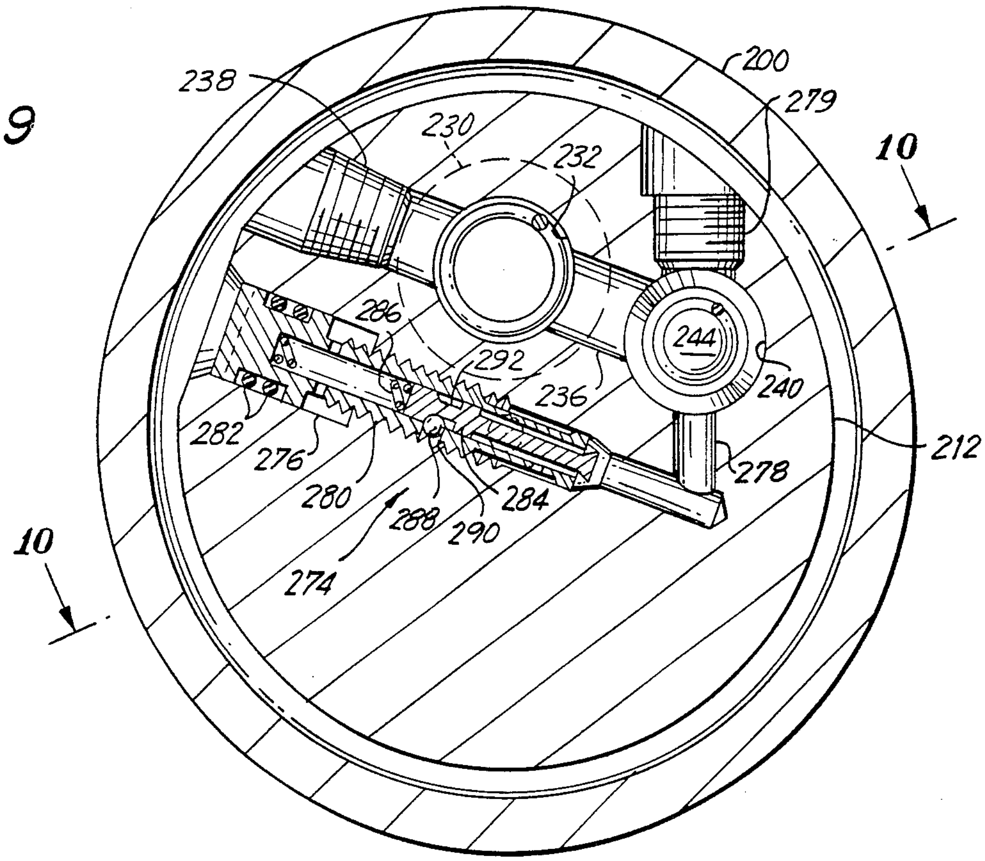
FIG. 9 is a transverse cross sectional view taken along line 9—9 of FIG. 8.
Figure 10:
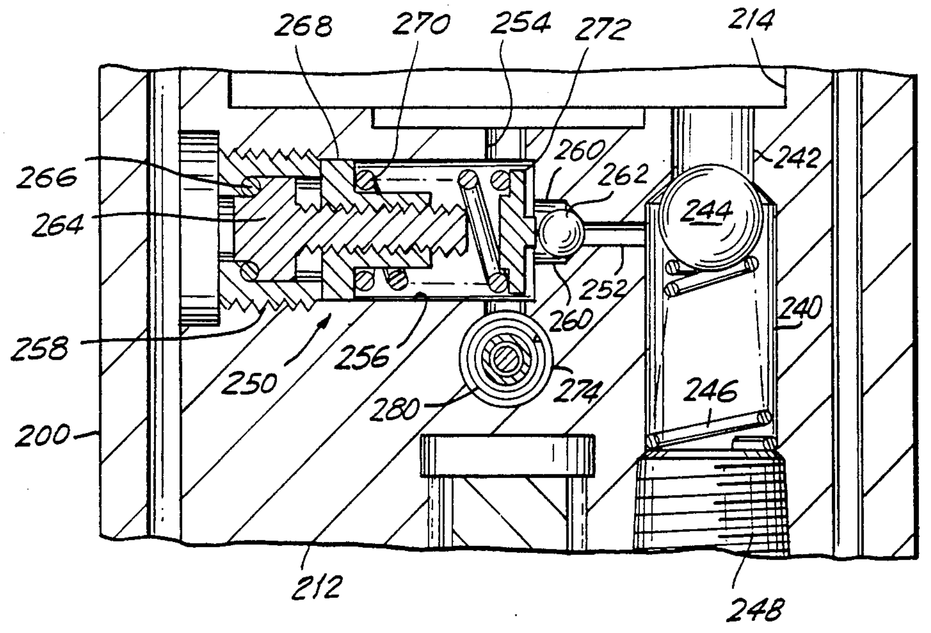
FIG. 10 is a fragmentary longitudinal cross section taken along line 10—10 of FIG. 9.

Referring now to FIGS. 9 and 10, the bore 232 communicates with a blind cross bore 236 closed by plung 238 where it leaves the cylindrical cage 212. Cross bore 236 communicates with longitudinal bore 240 which contains a reduced portion 242 adjacent the bore 214. A ball check valve 244 is located within the bore 240 and is seated against the reduced portion 242 thereof by a compression spring 246 positioned by a plug 248 which seals the bore 240. The ball check valve 244 permits hydraulic fluid to enter the bore 232 behind driver 230 (and connecting passages) whenever the pressure within the cylindrical bore 214 is greater than the pressure within the bore 232 behind driver 230.

An adjustable pressure relief valve means 250, best shown in FIG. 10, communicates with the bore 240 through passageway 252 and with the cylindrical bore 214 through passageway 254. The pressure relief valve means 250 comprises a transverse bore 256 formed in the rotatable cage 212 and threaded in the region near the surface of the cage 212 to receive a sealing collar 258. A ball valve seat 260 communicates between the bore 256 and the passageway 252 and positions a ball valve 262. An adjusting screw 264, sealed against the colar 258 by an O-ring 266, is threaded into an adjusting nut 268 which carries one end of compression spring 270. The other end of the compression spring 270 is seated on retainer plate 272 which bears against the ball valve 262. It will be understood that rotation of the adjusting screw 264 will change the axial location of the adjusting nut 268 thereby altering the force exerted on the ball valve 262 by the spring 270 acting through the plate 272.

Figure 11:
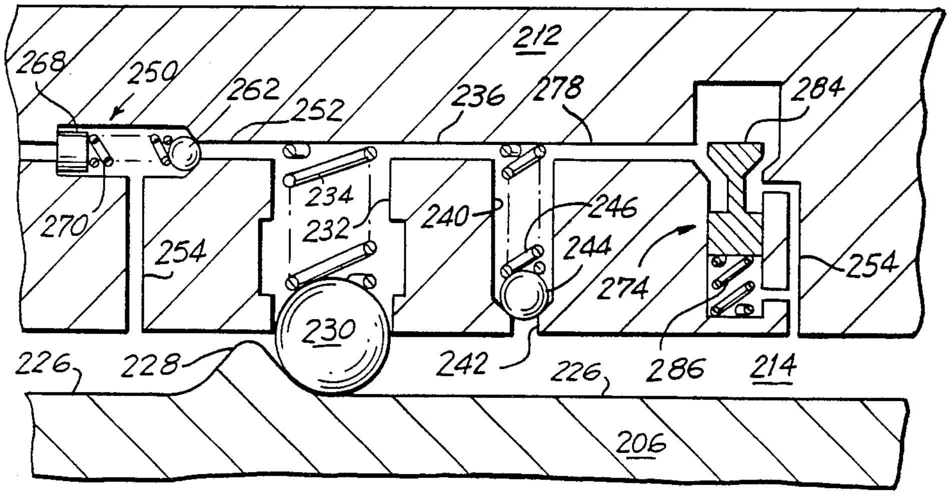
FIG. 11 is a schematic drawing which shows more clearly the interrelationships among the operating components of the form of the invention shown in FIGS. 8, 9, 10 and 12.

A by-pass valve means 274, best shown in FIG. 9, communicates between the passageway 240 behind ball check valve 244 and the cylindrical bore 214. By-pass valve means 274 comprises a transverse bore 276, threaded in its central region which communicates in its central region with passageway 254 and, at its inner end, with passageway 278, which passageway, in turn, communicates with the adjustable pressure relief means 250, driver means 230 and ball check valve 244. The open end of the passageway 278 is sealed by a plug 279. A valve body 280 threaded into the bore 276 carries O-rings 282 which seal the open end of the bore 276. Restrictor valve 284 is positioned for reciprocating motion along the axis of valve body 280 and biased toward the open position by compression spring 286. Motion of restrictor valve 284 in a direction to open the valve is limited by a check ball 288 positioned in a hole 290 formed in the valve body 280 and a circumferential groove 292 formed in the restrictor valve 284. The rate of compression spring 286 is selected so that the restrictor valve 284 will remain open until the pressure in passageway 278 (and the remaining passageways interconnected therewith) reaches a predetermined amount, e.g., 300 psig.

the operation of the mechanism may conveniently be described with reference to the schematic view shown in FIG. 11. It will be understood that the outer casing 200 is filled with hydraulic fluid or oil. The rotatable cage 212 is connected to and driven by the air motor drive shaft 210. As the cage 212 begins to rotate it carries with it driver 230 which can move within the bore 232 and also contacts the cam surface 226. When the driver 230 reaches the cam rise 228 it applies a force to the impulse member 206 through the cam rise 228 which force may be resolved into an axial force and a torque. The axial force appears as a normal load on the thrust bearing 220 and an equal and opposite force tending to drive the driver 230 into the bore 232. The torque tends to rotate the impulse member 206 in the same direction as the cage 212 is rotating, which may be either clockwise or counterclockwise. It will be appreciated that the cage 212 and impulse member 206 will rotate as a unit until the fastener being driven either absorbs the kinetic energy of the rotating parts or the pre-set torque has been obtained.

When a load is applied to the impulse member 206, the driver 230 begins to ride up the cam rise 228 and is forced into the bore 232 compressing the spring 234 and the oil contained in the bore 232. When the pressure exceeds a predetermined level, e.g., 300 psi, the by-pass valve means 274 closes and pressure will continue to build up in the passageways behind the driver 230 as it is driven into the bore 232. The rising pressure behind the driver 230 is reflected as an increase in the torque applied to the impulse member 212 through the cam rise 228. In the event that the work, i.e., the fastening being tightened or loosened, absorbs the kinetic energy of the cage 212 and its associated parts without attaining the pre-set torque, both the cage 212 and the impulse member 206 will come to rest. When, as a result of leakage and reverse motion of the cage 212, the pressure behind the driving ball 230 drops below the pre-set pressure, e.g. 300 psi, by-pass means 274 opens and hydraulic fluid flows through the by-pass means 274. With the impulse member 206 still at rest, the air motor 202 rotates the cage 212 and drives the driver 230 over the cam rise 228. As the driver 230 rides down the cam rise 228 in response to the bias of spring 234, the driver moves outwardly in the bore 232 and check valve 244 opens to permit the refilling of the passageways behind the driver 230 with oil. Simultaneously, the air motor 202, which is temporarily unloaded, begins to accelerate the cage 212 and its associated parts and provides the cage with a quantum or pulse of kinetic energy which can be delivered to the impulse member 206 when the driver 230 again contacts the cam rise 228. This cycle of events is repeated until the pre-set torque has been delivered to the fastener by the impulse member 206.

When the fastener is tightened to the pre-set torque, the pressure behind the driver rises to the level set by the adjustable pressure relief means 250 whereupon the ball valve 262 opens. It will be seen that after the predetermined torque has been applied by the impulse member 206 the air motor 202 will continue to rotate and cyclically to apply a torque to the impulse member 140 of identical magnitude in each cycle. As the torque builds up from a zero level during each cycle there is no impact involved and the applied torque will not increase or produce excessive tightening even though the air motor 202 is allowed to continue to operate after the impulse member 206 has ceased to turn.

It will be appreciated that the adjustable pressure relief means 250 shown in FIGS. 8 and 10 performs a function equivalent to that of the adjustable stroke piston 102 shown in FIG. 2 and it is therefore within the scope of the present invention to utilize these mechanisms interchangeably in either form of the invention disclosed herein.

Similarly, the thrust member mechanisms comprising the thrust member 54 and compression spring 52 and the expansion chamber mechanism comprising the expansion chamber 51 and piston 53 shown in FIG. 2 may be incorporated into the impulse member 206 shown in FIG. 8, if desired.

In the emodiments shown in FIGS. 1–5 and 8–12 a substantial thrust force is developed on the impulse member. While it is preferable to provide an anti-friction thrust bearing as illustrated in FIGS. 2, 5 and 8 this bearing may be omitted and the head of the impulse member 48, 222 allowed to contact the threaded cap 36, 216 directly, lubrication being provided by the oil contained within the cage. Any variability in the coefficient of friction in such a modification will, or course, affect the torque delivered by the device.

The thrust may also be balanced by providing a cam surface on opposite faces of the impulse member 42, 206 and corresponding opposed pressure cylinders. Alternatively, the impulse member cam may be formed on the outside periphery of the head of the impulse member 42, 206 as shown in detail in FIGS. 6 and 7.

The terms and expressions which have been employed are used as terms of description and not of limitation and there is no intention in the use of such terms and expression of excluding any equivalents of the features shown and described or portions thereof but it is recognized that various modifications are possible within the scope of the invention claimed.

What is claimed is:

1. A rotary impulse device adapted to be driven by electric or air motor driving means having a rotary drive shaft comprising a generally cylindrical outer casing member affixed at one end to said driving means and carrying bearing means at the opposite end thereof, generally cylindrical rotatable cage means having first and second ends positioned within said outer casing member and drivingly connected at said first end to said rotary drive shaft of said driving means, said cage means filled with hydraulic fluid, a driven impulse member having a head portion disposed within said rotatable cage means and a shaft portion journalled within said outer casing member for rotation with respect thereto and journalled for supporting said second end of said rotatable cage means, said shaft portion of said driven impulse member adapted to carry a work engaging tool at its outer end, cam surface means formed on the head portion of said impulse member, ball means carried in a first bore formed in said cage means, said ball means positioned in said first bore adjacent said cam surface, biasing means adapted to bias said ball means toward said cam surface and means to develop hydraulic pressure in said first bore in response to motion of said ball means within said first bore, hydraulic check valve means communicating between a pressurized region either said first bore and a region outside said first bore adjoining said cam surface means formed on the head portion of said impulse member and said hydraulic check valve means adapted to open whenever the hydraulic pressure developed in said first bore drops below a predetermined pressure and to close whenever the hydraulic pressure developed in said first bore rises above such predetermined pressure, and torque adjusting means communicating with said first bore.

2. A rotary impulse device as described in claim 1 wherein said hydraulic check valve means comprises first and second telescoping pistons mounted for reciprocating motion within said first bore, said first piston having a flange portion adapted at its outer periphery to sealingly engage said first bore and having at least one orifice formed through said flange, said second piston having a flange portion adapted to engage the flange portion of said first piston and seal said orifice in said flange of said first piston, and second biasing means adapted to bias the flange portion of said first piston away from the flange portion of said second piston.

3. A rotary impulse device as described in claim 1 wherein the torque adjusting means comprises a second bore communicating with said first bore, piston means mounted for reciprocating movement between first and second positions within said second bore, adjustable collar stop means positioned within said second bore adapted to define said second position of said piston means within said second bore and second biasing means seated against said adjustable collar stop means and biasing said piston means toward said first position of said piston means.

4. A rotary impulse device as described in claim 3 wherein said cylindrical outer casing is provided with a removable plug alignable with said adjustable collar stop means.

5. A rotary impulse device as described in claim 3 wherein said hydraulic check valve means is incorporated within said second piston means, said second piston means having a blind bore formed therein and an orifice communicating through said second piston means from the bottom of said blind bore, hydraulic check valve means mounted for reciprocating motion within said blind bore between a first position biased away from said orifice and a second position sealing said orifice, said check valve occupying said first position whenever the pressure in said first bore behind said ball means is less than a predetermined pressure and occupying said second position whenever the pressure in said first bore behind said ball means is greater than said predetermined pressure.

6. A rotary impulse device as described in claim 5 wherein said cylindrical outer casing is provided with a removable plug alignable with said adjustable collar stop means.

7. A rotary impulse device as described in claims 5 or 6 and comprising, in addition, means adapted to bias said head portion of said impulse member in a direction away from said electric or air motor driving means.

8. A rotary impulse device as described in claim 7 wherein said means adapted to bias said head portion of said impulse member comprises a blind axial bore formed through the head portion of said impulse member and into the shaft portion of said impulse member, thrust member means carried in said blind axial bore, and third biasing means adapted to bias said thrust member means toward said rotatable cage means.

9. A rotary impulse device as described in claim 1 wherein said hydraulic check valve means comprises a ball check valve seated in a first check first and second telescoping pistons mounted valve bore communicating between the pressurized for reciprocating motion within said first bore, said first piston having a flange portion adapted at its outer periphery to sealingly engage said first bore and having at least one orifice formed through said flange, said second piston having a flange portion adapted to engage the flange portion of said first piston and seal said orifie in said flange of said first piston second biasing means adapted to bias the flange portion of said first piston away from the flange portion of said second piston and wherein said torque adjusting means comprises a second bore communicating with said first bore, third piston means mounted for reciprocating movement between first and second positions within said second bore, adjustable collar stop means positioned within said second bore adapted to define said second position of said third piston means within said second bore and third biasing means seated against said adjustable collar stop means and biasing said third piston means toward said first position of said third piston means.

10. A rotary impulse device as described in claims 1, 2, 3, 4 or 5 and comprising, in addition, means adapted to bias said head portion of said impulse member in a direction away from said electric or air motor driving means.

11. A rotary impulse device as described in claim 10 wherein said means adapted to bias said head portion of said impulse member comprises a blind axial bore formed through the head portion of said impulse member and into the shaft portion of said impulse member, thrust member means carried in said blind axial bore, and third biasing means adapted to bias said thrust member means toward said rotatable cage means.

12. A rotary impulse device as decribed in claim 1 wherein said hydraulic check valve means comprises a ball check valve seated in a first check valve bore communicating between the pressurized region within said first bore and the region outside said first bore adjoining the head portion of said impulse member and biasing means in the pressurized region of said first check valve bore biasing said ball check valve toward its seated position.

13. A rotary impulse device as described in claim 1 where said torque adjusting means comprises a second check valve bore communicating between the pressurized region within said first bore and the region outside said first bore adjoining the head portion of said impulse member, a second check valve seated in said second check valve bore, and adjustable biasing means in the non-pressurized region of said second check valve bore biasing said second check valve toward its seated position.

14. A rotary impulse device as described in claim 1 wherein said hydraulic check vave means comprises a ball check valve seated in a first check valve bore communicating between the pressurized region within said first bore and the region outside said first bore adjoining the head portion of said impulse member, biasing means in the pressurized region of said first check valve bore biasing said ball check valve toward its seated position and wherein said torque adjusting means comprises a second check valve bore communicating between the pressurized region within said first bore and the region outside said first bore adjoining the head portion of said impulse member, a second check valve seated in said second check valve bore, and adJustable biasing means in the non-pressurized region of said second check valve bore biasing said second check valve toward its seated position.

15. A rotary impulse device as described in claims 12, 13 or 14 and comprising, in addition, means adapted to bias said head portion of said impulse member against said thrust bearing between said head portion of said impulse member and said rotatable cage means.

16. A rotary impulse device as described in claim 15 wherein said means adapted to bias said head portion of said impulse member against said thrust bearing comprises a blind axial bore formed through the head portion of said impulse member and into the shaft portion of said impulse member, thrust member means carried in said blind axial bore, and fourth biasing means adapted to bias said thrust member means toward said rotatable cage means.

* * * * *